US011221944B1

(12) United States Patent
Wang et al.

(10) Patent No.: US 11,221,944 B1
(45) Date of Patent: Jan. 11, 2022

(54) MANAGING METADATA FOR A BACKUP DATA STORAGE

(71) Applicant: VMware, Inc., Palo Alto, CA (US)

(72) Inventors: Wenguang Wang, Santa Clara, CA (US); Vamsi Gunturu, Palo Alto, CA (US); Junlong Gao, Palo Alto, CA (US); Ilya Languev, Palo Alto, CA (US); Petr Vandrovec, Palo Alto, CA (US); Maxime Austruy, Lausanne (CH); Ilia Sokolinski, Boston, MA (US); Satish Pudi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/002,667

(22) Filed: Aug. 25, 2020

(51) Int. Cl.
*G06F 12/12* (2016.01)
*G06F 12/02* (2006.01)
*G06F 12/109* (2016.01)

(52) U.S. Cl.
CPC ........ *G06F 12/0223* (2013.01); *G06F 12/109* (2013.01); *G06F 2212/1024* (2013.01)

(58) Field of Classification Search
CPC ............... G06F 12/0223; G06F 12/109; G06F 2212/1024
See application file for complete search history.

(56) References Cited

U.S. PATENT DOCUMENTS

2011/0196822 A1* 8/2011 Zunger ................... G06F 16/27 707/609
2011/0196900 A1* 8/2011 Drobychev ............. G06F 16/23 707/812
2016/0170987 A1* 6/2016 Kesselman ......... G06F 16/2255 707/747
2018/0246934 A1* 8/2018 Arye ................... G06F 16/2272
2020/0175074 A1* 6/2020 Li ....................... G06F 12/0871
2021/0173812 A1* 6/2021 Garaga ................... G06F 16/13
2021/0263678 A1* 8/2021 Glimcher .............. G06F 3/0659

OTHER PUBLICATIONS

Y. Zhu and J. Masui, "Backing Up Your Data to the Cloud: Want to Pay Less?," 2013 42nd International Conference on Parallel Processing, 2013, pp. 409-418.*

P. Zhang, L. Xing, N. Yang, G. Tan, Q. Liu and C. Zhang, "Redis++: A High Performance In-Memory Database Based on Segmented Memory Management and Two-Level Hash Index," 2018 IEEE Intl Conf on Parallel & Distributed Processing with Applications, Ubiquitous Computing & Communications, 2018, pp. 840-847.*

* cited by examiner

*Primary Examiner* — Pierre Miche Bataille
(74) *Attorney, Agent, or Firm* — Patterson + Sheridan, LLP

(57) ABSTRACT

A method for managing metadata for data stored in a cloud storage is provided. The method receives, at a first of a plurality of metadata servers, information associated with an object stored in the cloud storage, the information comprising a plurality of LBAs for where the object is stored. Each metadata server allocates contiguous chunk IDs for a group of objects. The method generates a new chunk ID for the object, which is a combination of a unique fixed value and a monotonically incrementing local value associated with each LBA, such that a first LBA is mapped to a first chunk ID having a first local value and a next LBA is mapped to a second chunk ID having the first local value incremented as a second local value. The method stores the new chunk ID and other metadata in one or more tables stored in a metadata storage.

20 Claims, 5 Drawing Sheets

Object Table 142

| ObjID | SnapID | LBA | → | ChunkID | NumBlocks |
|---|---|---|---|---|---|
| 1 | 1 | 0 | | 100, 0 | 3000 |
| 1 | 1 | 0 | | 100, 0 | 1 |
| 1 | 1 | 1 | | 101, 1 | 1 |
| 1 | 1 | 2 | | 102, 2 | 1 |
| ... | | | | | |
| 1 | 1 | 2999 | | 100, 2999 | 1 |

405 → 
410 →

Chunk Table 144

| ChunkID | → | SegmentID | NumBlocks |
|---|---|---|---|
| 100, 0 | | 1 | 1000 |
| 100, 0 | | 1 | 1 |
| 101, 1 | | 1 | 1 |
| 102, 2 | | 1 | 1 |
| ... | | | |
| 100, 999 | | 1 | 1 |

415 →
420

Chunk ID Table 146

<Object ID, Seq. Value>

100, 1450
...

440

MANAGING METADATA FOR A BACKUP DATA STORAGE

BACKGROUND

The amount of data worldwide grows each year, thus requiring more storage resources. Further, protecting the already stored data (e.g., in a datacenter) against disastrous events, such as storage failure or cyber-attacks, which can completely disrupt the business operations, is essential for every enterprise. An enterprise needs to back up the data stored in its primary data storage(s) at some other storage devices (e.g., in the cloud) so that when the original data is damaged or lost, the backed up data can be restored (e.g., through a disaster recovery process) and used. As such, it is increasingly important to store backup data (e.g., related with virtual machines or other types of virtual computing instances of a primary datacenter) in one or more other (e.g., remote) data storages, such as with low cost and high efficiency, such that when a disaster happens, a data recovery system (e.g., a secondary datacenter) can restore the backed up data and start running (e.g., the virtual machines of the primary datacenter) in the shortest possible time.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
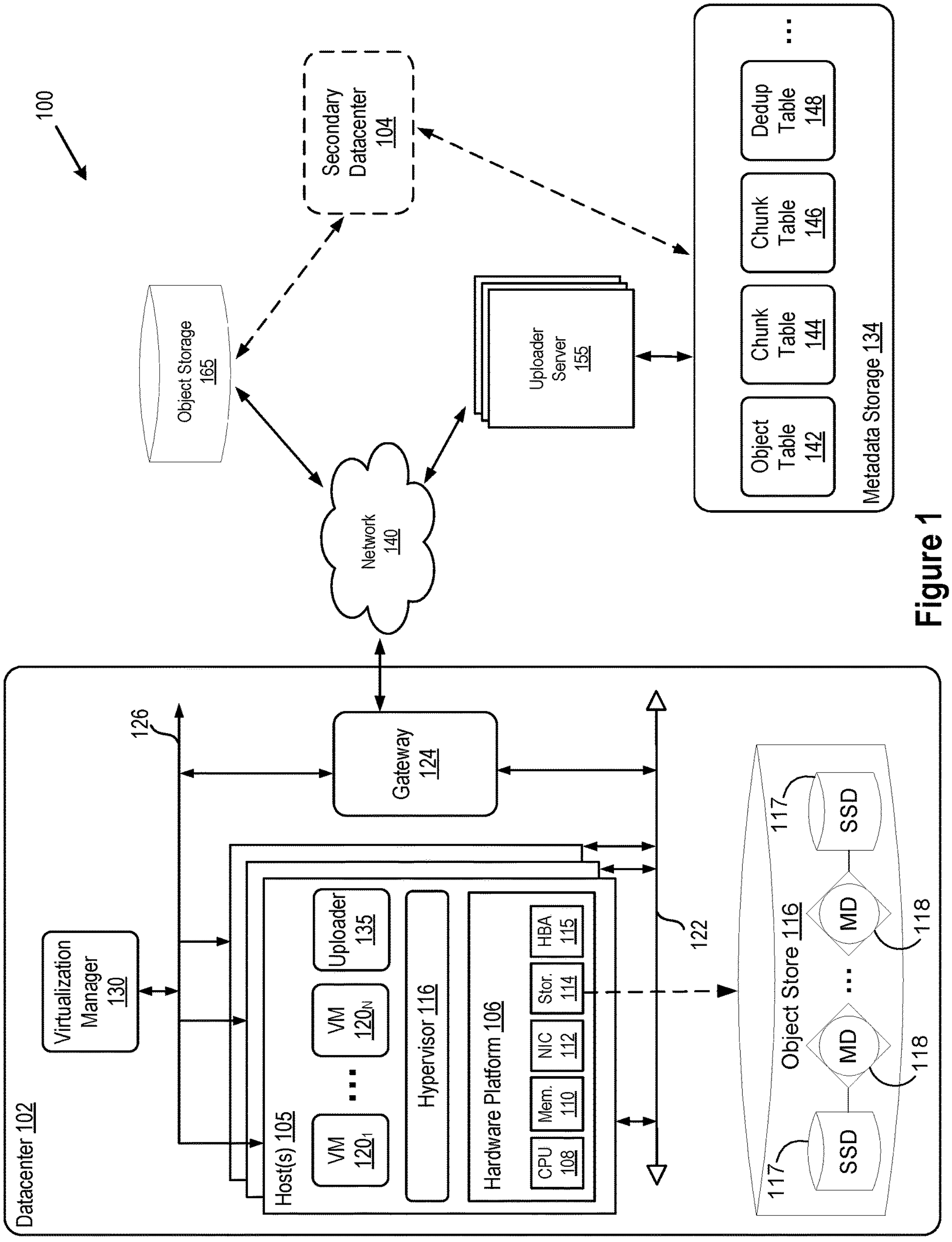
FIG. 1 is a block diagram illustrating a computer system in which one or more embodiments of the present application may be utilized.

The present disclosure provides techniques for storing data (e.g., backup data) in (e.g., remote) storage(s). The techniques include storing the data (e.g., related to virtual machines, other types of virtual computing instances, etc.) separately from metadata that defines the data and creating a data structure that organizes the metadata. In some embodiments, the organization of metadata may preserve order and locality of chunks of data that are stored in a separate datastore. A chunk of data may include a portion of a data object (may also be referred to as an object), such as a virtual disk (VMDK) of a virtual machine (VM), one or more snapshots of the VMDK, etc., as further described below.

Such organization and locality of metadata may result in improvements in subsequent datastore operations, such as data read/write, data deduplication, etc. For example, upon a read or write operation, the preservation of locality of metadata may result in the likely pre-fetching, from storage into a memory cache, metadata of subsequent and contiguous chunks. The preserved locality may result in faster subsequent read and write operations of metadata, because the read and write operations are executed from memory rather than from storage. Additionally, an improvement in a deduplication process may result in an improvement in the functioning of the computer itself. For example, an improvement in deduplication may improve the way a computer stores and retrieves data in memory (and in storage) in some embodiments.

In some embodiments, an uploader manager residing in each host machine of a datacenter (e.g., an agent executing in the hypervisor of the host machine, a VM, a container, or any other user space instance running on the host machine) may receive the data stored in a data storage of the datacenter and store it as backup data in a (e.g., remote) storage (e.g., an object storage in the cloud). The data may relate to datacenter objects (e.g., VMDKs, or other objects associated with the client VMs executing in the datacenter) and the uploader manager may store the data as separate chunks (e.g., having fixed data block sizes) in the object storage.

The uploader manager may also send information associated with the backup data (or objects) to a set of one or more uploader servers (or metadata servers) to create, store, and manage metadata associated with the backup data. The information associated with an object that is stored in the object storage may include, but is not limited to, an Object ID associated with the object, logical block addresses where the object is stored, a hash of each block, etc. The set of uploader servers may use the received information to generate the metadata and store the generated metadata in a metadata storage separate from the object storage. In some embodiments, a log-structured file system (LFS), which allows low write amplification, may be used to store the object data, and a log-structured merging (LSM) tree may be used to store and manage the metadata. In some embodiments, some parts of metadata may be stored in a scale-out key-value (KV) datastore (e.g., TiKV), while some other parts of metadata may be stored in other databases (e.g., a SQL datastore).

As described further below, an important part of metadata created and stored by the set of uploader servers are the chunk identifications (IDs) that are associated with the chunks of backup data and are used, for example, to access the chunks in the object storage. As described above (and will be further described in more detail below), the chunk IDs have to be contiguous to preserve locality of data (e.g., during a subsequent datastore operation) and to maintain efficiency in storing the metadata. For example, since the chunks of data are stored sequentially in the object storage, the chunk IDs that point to the sequentially stored chunks have to be contiguous to maintain the spatial locality of the chunks of data. However, since, in some embodiments, a scale-out architecture is used for creation and management of metadata (e.g., multiple uploader/metadata servers concurrently assign chunk IDs for different chunks of data objects), preserving the contiguousness of unique chunk IDs may become a challenging task. One solution to this challenge is using a centralized coordinator server that allocates batches of chunk IDs to different uploader servers. This solution, however, may have its own shortcomings. For example, any failure in the centralized coordinator server may result in disability of the whole system in producing new chunk IDs. Additionally, the communications between the centralized coordinator and the uploader servers may unreasonably increase the network traffic.

To remove the uploader servers' dependency on a centralized coordinator server and to improve the network traffic, each uploader server may generate unique and contiguous chunk IDs for a particular group of objects independent of other uploader servers. A chunk ID, in some embodiments, may include a two-tuple identifier that is generated by combining (e.g., concatenating) a unique fixed value (e.g., the object ID) with a monotonically incremental value (e.g., a sequential number). In some embodiments the chunk ID may include a certain number of bits (e.g., 64 bits) with the higher (most significant) bits (e.g., 20 bits) allocated to the unique (global) value and the lower (least significant) bits (e.g. 44 bits) allocated to the incremental local value. In some other embodiments, the chunk ID may have a different size and the local and global values may be assigned different numbers of bits.

The two-tuple chunk IDs may be stored in an ordered KV table (e.g., in the metadata storage) in some embodiments. For allocating (e.g., generating and assigning) a new chunk ID to a chunk of data of a current object, or a new object, only one of the uploader servers may be selected to operate on the KV table for that object. To make such a selection, in some embodiments, the uploader manager residing in the host machines may perform a hashing algorithm (e.g., a consistent hashing algorithm) to calculate a hash that maps to a particular one of the uploader servers (e.g., the server that should allocate the new chunk ID(s) to the object that is stored in the object storage). After making such determination (and after sending the object to be stored in the object storage), the uploader manager may send information about the object to the selected uploader server. The uploader server, in some embodiments, may first make sure that it is the only server that is updating the chunk ID table to allocate the new chunk ID for the particular object. To do so, in some embodiments, the uploader server may leverage a distributed consensus system (e.g., ETCD, ZOOKEEPER, etc.) along with lease and callback functions to ensure no other uploader server is updating the table for the same object (e.g., no other server is allocating new chunk IDs for the same object).

After determining that there is no other uploader server concurrently working on the same object, the selected uploader server may create a two-tuple chunk ID (e.g., a lookup chunk ID) that is a combination of a unique fixed value (e.g., the object ID associated with the object that is stored in the object storage) as the first tuple, and a highest possible value as the incremental value (e.g., 0xFFFFFFFFFFF when 44 bits is allocated to the incremental value) as the second tuple of the lookup chunk ID. The uploader server may then perform a reverse scan of the KV table to identify the last used largest chunk ID in the table. For example, the uploader server may generate a lookup chunk ID that is a concatenation of the object ID and 0xFFFFFFFFFFF. The uploader server may then look up the KV table for a chunk ID that has the highest value before the generated lookup chunk ID.

In some embodiments, if the uploader server finds a chunk ID that has a highest value before the lookup chunk ID, the server may determine the next chunk ID that can be generated and assigned to the first chunk of the newly stored object from the found chunk ID. For example, the uploader server may generate a new two-tuple chunk ID that has the same first tuple (e.g., the unique fixed value) as the found chunk ID and a second tuple that has the next sequential value after the second tuple of the found chunk ID (e.g., that is equal to the number in the second tuple of the found chunk ID plus one) in some embodiments. On the other hand, if the uploader server does not find a chunk ID that has a highest value before the lookup chunk ID in the KV table, the uploader server may generate a chunk ID (e.g., to be assigned to the first chunk of the newly stored object) that has the same first tuple (e.g., the unique fixed value) as the lookup chunk ID and an initial value (e.g., zero) as the second tuple. The server may then update the KV table with the generated chunk ID. For example, if the generated chunk ID is the first chunk ID for the object, the uploader server may add the generated chunk ID to the KV table (e.g., create a new record for the new chunk ID in the table). Otherwise, the uploader server may replace the previously stored chunk ID with the newly generated chunk ID in the KV table.

FIG. 1 is a block diagram illustrating a computer system 100 in which one or more embodiments of the present application may be utilized. Computer system 100 includes a datacenter 102, a secondary datacenter 104, a network 140, several uploader servers 155, an object storage 165, and a metadata storage 134. Network 140 may be, for example, a direct link, a local area network (LAN), a wide area network (WAN), such as the Internet, another type of network, or a combination of one or more of these networks.

Datacenter 102 may include host(s) 105, a virtualization manager 130, a gateway 124, a management network 126, a data network 122, and an object store 116. Networks 122 and 126 may provide Layer 2 or Layer 3 connectivity in accordance with the Open Systems Interconnection (OSI) model, with internal physical or software defined switches and routers not being shown. Although management and data network 126 and 122 are shown as separate physical networks, it is also possible, in some implementations, to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack. Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 enables host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Local storages 114 housed in, or directly attached to, host machines 105, may provide an aggregate object store 116 for virtual machines (VMs) 120 running on hosts 105. As shown and described, object storage 116 may include combinations of solid state drives (SSDs) or non-volatile memory express (NVMe) drives 117, magnetic or spinning disks or slower/cheaper SSDs 118, or other types of storages. The objects stored in object store 116 may include file system objects and other VM related objects, such as virtual disks (VMDKs) of the VMs, etc.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 may also include a cache that includes cached copies of storage blocks of objects in storage 114 or object store 116. The cached storage blocks in cache may be fetched into memory 110 during different memory operations, such as memory read/write, deduplication, etc.

Host 105 is configured to provide a virtualization layer, also referred to as a hypervisor 116, that abstracts processor, memory, storage, and networking resources of hardware platform 106 into multiple virtual machines 1201 to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine.

It should be noted that although the disclosure is described with reference to VMs, the embodiments described herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 provides hosts 105, VMs 120, and other components in data center 102 with connectivity to one or more networks used to communicate with one or more remote datacenters and/or other devices/servers, such object storage 165, uploader servers 155, secondary datacenter 104, etc., for example, through network 140. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Host 105 also includes uploader manager 135 which may manage uploading data to object storage 165 and uploader servers 155 for backup in some embodiments. Although shown as a VM, uploader manager 135 may be any other type of a VCI, such as a container, a data compute node, an isolated user space instance, etc., in some embodiments. Additionally, uploader manager 135 may be an agent (e.g., a module) running in hypervisor 116 of host 105 in some embodiments. In some embodiments, uploader manager 135 may be part (e.g., a submodule) of a storage management module (also referred to as a vSAN module) that automates storage management workflows (e.g., create objects in the object store, etc.) and provides access to objects in the object store 116 (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (TOPS), etc.), the administrator may define a storage profile or policy for each VM specifying such availability, capacity, TOPS and the like. As such, the vSAN module may then create an "object" for the specified virtual disk by backing it with physical storage resources of the object store 116 based on the defined policy.

Uploader manager 135 may receive an object data stored in object store 116 and send the data to object storage 165 (e.g., in the cloud) to be stored as backup data for the object. The data may include different snapshots (e.g., backups, delta backups containing only changed data since a previous backup, etc.) of the object taken at different points of time. In some embodiments, uploader manager 135 may send the first snapshot of the object to the data storage 165 and subsequently send only the snapshot differences (may also be referred to as "snapshot diffs", or "cliffs") to the data storage to be backed up. Additionally, in some embodiments, uploader manager may send information associated with the object, such as the object ID, the snapshot ID, logical block addresses (LBAs) in which the object is stored, etc., to a set of one or more uploader servers 155. In some embodiments, in addition to objects and their snapshots, uploader manager 135 may store files (and their snapshots) in object storage 165 or another remote storage for backup purposes and send information associated with the stored files to uploader servers 155.

The objects may be stored in a log-structured file system (LFS) format in object storage 165 in a set of one or more segments. In some embodiments, each object may be stored in fixed block sizes of data (e.g., each block being 4 kilobyte (KB)) in one or more segments that have fixed segment sizes (e.g., 4 megabyte (MB) for each segment) in object storage 165. Each fixed block size may also be called a chunk of data or simply a chunk in some embodiments. It should be noted that when files are stored in object storage 165 (or any other storage), the chunks may have different sizes (e.g., that are defined on a byte-boundary basis using, for example, robin hash fingerprints). More detail about storing files in variable-sized chunks is described in commonly owned U.S. patent application Ser. No. 16/552,998, entitled "ORGANIZE CHUNK STORE TO PRESERVE LOCALITY OF HASH VALUES AND REFERENCE COUNTS FOR DEDUPLICATION," filed on Aug. 27, 2019, the entire content of which is incorporated herein by reference.

In some embodiments, the set of uploader servers may receive information associated with the objects stored in object storage 165 (e.g., as a plurality of chunks), generate metadata associated with each object based on the received information, and store the generated metadata in different data structures in metadata storage 134. As shown in the figure, uploader servers 155 may interact with metadata storage 134 to create, update, and manage metadata tables, such as tables 142, 144, 146, and 148. In some embodiments, all or some of the metadata tables stored in metadata storage 134 may be key-value (KV) tables. A KV table may include a table ordered by keys that when given a key, may return a value that is mapped to that key. Each of the KV tables 142, 144, 146, and 148 is described in more detail below with reference to FIGS. 3 and 4. It should be noted that even though only 4 metadata tables are shown in the FIG. 1, metadata storage 134 may include many more or less tables and/or other forms of data structures that contain other metadata. For example, metadata storage 134 may include an additional KV hash table (not shown in the figure) that maps the calculated hashes of chunks (e.g., associated with an object) to the chunk IDs of the object in some embodiments.

In case of a failure in datacenter 102 (e.g., when part or all of the data stored in object store 116 is damaged or lost, when datacenter 102 is under a cyber-attack, etc.), a secondary or recovery datacenter, such as secondary datacenter 104, may use the metadata stored in the metadata storage 134 to retrieve the backed up data stored in object storage 165. After retrieving the backup data (e.g., snapshots of the VMDKs), secondary datacenter 104 may use the data to recreate the objects (e.g., the virtual disks) and run the VMs of datacenter 102. The organization of metadata in metadata storage 134 and object data in object storage 165 allows secondary datacenter 104 to be up and running in a short period of time after occurrence of a disastrous event in the primary datacenter 102.

Figure 2:
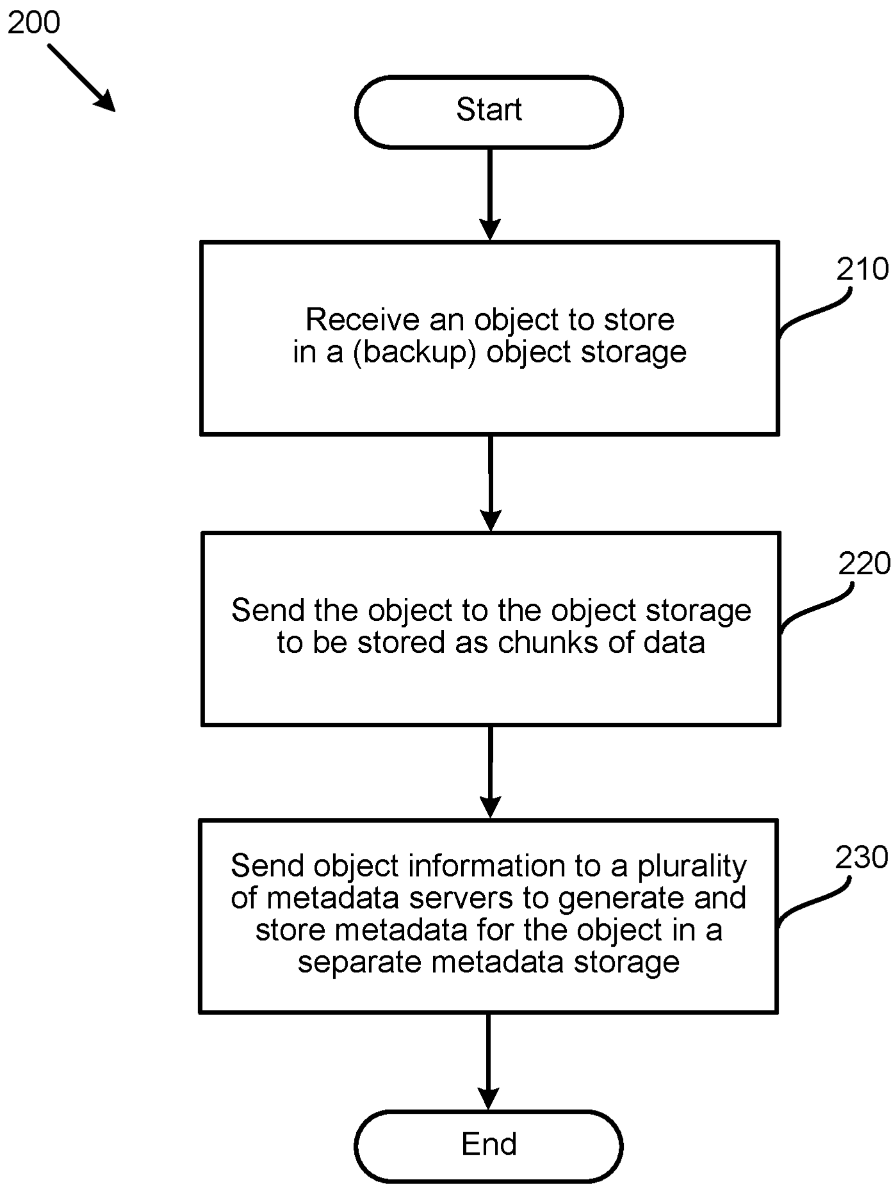
FIG. 2 is a flowchart illustrating a method (or process) for storing (backup) data in an object storage and metadata related to the (backup) data in a metadata storage, according to an example embodiment of the present application.

FIG. 2 is a flowchart illustrating a method (or process) 200 for storing (backup) data in an object storage, such as object storage 165 and metadata related to the (backup) data in a metadata storage, such as metadata storage 134, according to an example embodiment of the present application. The method 200 may be performed by an uploader manager, such as uploader manager 135, as described above with reference to FIG. 1 in some embodiments.

Process 200 may start by receiving, at 210, an object to be stored in a backup object storage, such as object storage 165. In some embodiments, the backup object storage may be a cloud storage. In some embodiments, the process may receive data related to an object when the object is created and being stored in object storage 165, while in some other embodiments, the process may receive the object data subsequent to the storing of the object in object storage 165. In some embodiments, process 200 may receive snapshots of the objects, or may generate the snapshots of the objects itself within certain time intervals and/or as instructed by an administrator (e.g., of a datacenter).

After receiving the object (or snapshot) data, process 200 may send, at 220, the object data, for example, to one or more storage servers to store the data at the object storage. As discussed above, in some embodiments, each object may be stored as blocks (or chunks) of data in one or more segments of the object storage. Each block may have a size of 4 KB and each segment may have a size of 4 MB in some embodiments. The sizes of the blocks and segments, however, may be different in different embodiments.

Process 200 may also send, at 230, information associated with the object to a plurality of metadata servers to generate and store metadata for the object in a separate metadata storage. For example, after sending data associated with an object to the object storage, process 200 may select one of the metadata servers as the only server that is responsible for generating contiguous chunk IDs for the object. As described above, the chunk IDs have to be contiguous to preserve locality of data (e.g., during a subsequent datastore operation) and to maintain efficiency in storing the metadata. To select a unique metadata server, process 200 may perform a dynamic hashing algorithm that results in selecting only one of the metadata servers for a specific object or group of objects.

A dynamic hashing algorithm leveraged by some of the present embodiments may include a distributed hashing scheme that operates independently of the number of uploader servers by assigning them a position on an abstract circle, or hash ring. This allows servers to scale without affecting the overall system. In other words, using a dynamic hashing algorithm, such as a consistent hashing algorithm, may allow for dynamic growth (e.g., addition of metadata servers) and shrinkage (e.g., deletion of metadata servers) of the plurality of metadata servers. The dynamic hashing algorithm, in some embodiments, may receive the number of servers and a number of random values for each server and may produce a unique hash that maps to only one (or a particular group) of the servers that should allocate the new chunk IDs to the object that is stored in the object storage. After selecting the metadata server among the plurality of metadata servers, process 200 may send information about the object (at 230) to the selected uploader server in some embodiments. The process may then end.

The specific operations of process 200 may not be performed in the exact order shown and described. Additionally, the specific operations may not be performed in one continuous series of operations, and different specific operations may be performed in different embodiments. For example, in some embodiments, process 200 may send the data associated with the object to the metadata servers (at 220) at the same time as, or before, sending the object to be stored in the object storage (at 230).

The information associated with an object that an uploader manager sends to a particular server in the plurality of metadata servers may include, but is not limited to, one or more of the object ID, snap ID, number of blocks the object occupies, hash of each block, etc. The server may, after determining that no other server in the plurality of servers is concurrently working on the same object (e.g., to assign new chunk IDs to the object), generate additional metadata associated with the object and store the metadata in one or more tables of the metadata storage. Some example tables generated and maintained by the metadata servers are described below, with reference to FIGS. 3 and 4.

Figure 3B:
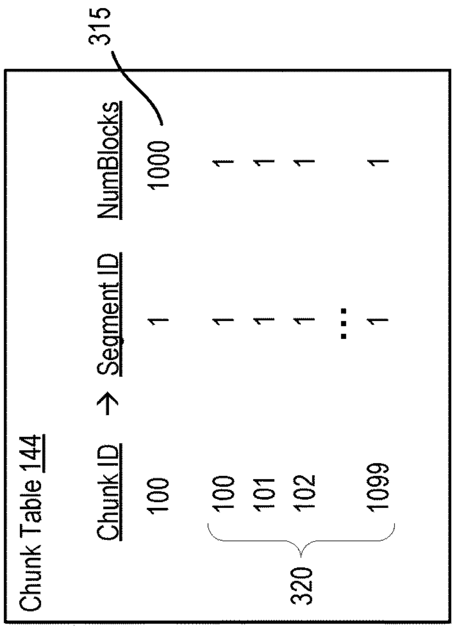
FIGS. 3A-3C illustrate exemplary metadata tables in the metadata storage, according to an example embodiment of the present application.
Figure 3A:
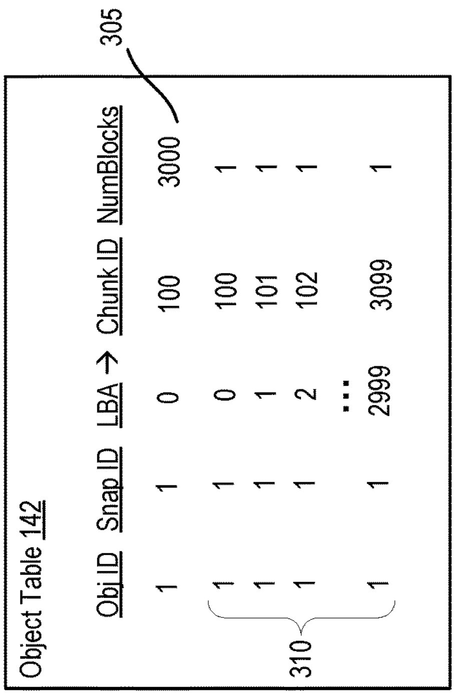
Figure 3C:
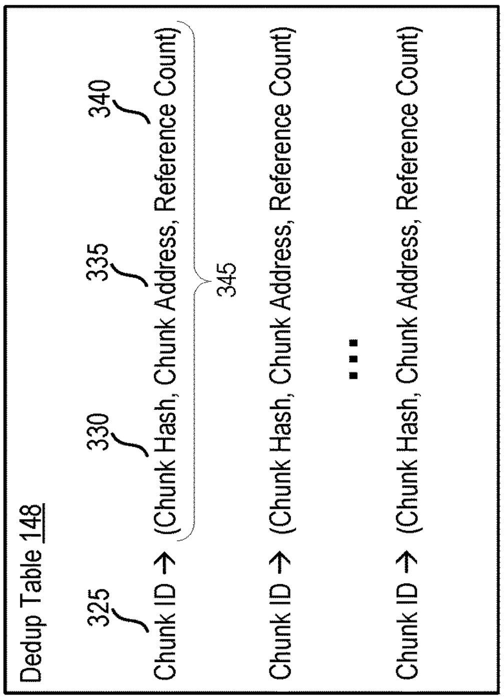

FIGS. 3A-3C illustrate exemplary metadata tables in the metadata storage, according to an example embodiment of the present application. Specifically, FIG. 3A illustrates an exemplary object table 142 that maps some of the received information associated with an object to the chunk IDs and number of (logical) blocks associated with the object, according to an example embodiment of the present application. For example, when an uploader server receives, for an object, an object ID of 1, a snapshot ID of 1, and a number of blocks of 3000, the uploader server may first generate a new chunk ID (as described below, with reference to FIG. 5) and then add a new record 305 to table 142 that maps a three-tuple key <object ID, snap ID, LBA> to a two-tuple value <chunk ID, number of blocks>.

As shown in FIG. 3A, the two-tuple value includes a chunk ID of 100 and a number of blocks of 3000. In other words, record 305 is an equivalent (or a compressed form) of all of the records 310, which include contiguous chunk IDs assigned to contiguous logical block addresses (LBAs). In order to be able to have only one record in the KV table 142, instead of 3000 records (e.g., records 310), as shown in FIG. 3A, the chunk IDs that are assigned to contiguous logical blocks of the object must be contiguous as well. It should be noted that “contiguous” may be defined in arbitrary increments in some embodiments. That is, although shown in this figure and other figures the chunk IDs to be increments of one, in some embodiments, contiguity may be defined in other increments (e.g., increments of 0.5, 5, 10, etc.). For example, if contiguity is defined in increments of 0.5, then after first chunk ID “100,” the next contiguous (e.g., the second) chunk ID is “100.5.” As another example, if contiguity is defined in increments of 10, then after chunk ID “100,” the next contiguous chunk ID is “110.” In some embodiments, the increments do not have to be fixed values. In some such embodiments, each successive chunk ID is greater (e.g., has a higher value) than the previous chunk ID.

FIG. 3B illustrates an exemplary chunk table 144 that maps the chunk IDs associated with an object to the segment IDs and number of (physical) blocks associated with the segment, according to an example embodiment of the present application. For example, after generating the chunk ID for the received object in table 142, the uploader server may add a new record 315 to table 144 that maps a one-tuple key <chunk ID> to a two-tuple value <segment ID, number of (physical) blocks>. As shown, the one-tuple key includes a chunk ID of 100 which is mapped to the segment ID of 1 and a number of (physical) blocks of 1000 (e.g., since each segment is 4 MB and each block/chunk is 4 KB, the number of physical blocks is 1000). In other words, record 315 is an equivalent (or a compressed form) of all of the records 320, which include contiguous chunk IDs mapped to contiguous physical blocks (or physical block addresses (PBAs)) in a segment. Again, in order to be able to have only one record in the KV table 144, instead of 1000 records (e.g., records 320), as shown in FIG. 3B, the chunk IDs that are assigned to contiguous physical blocks of the object must be contiguous as well.

FIG. 3C illustrates another example of how having contiguous chunk IDs may improve a deduplication process, for example, performed by a deduplication module. Specifically, FIG. 3C shows an exemplary deduplication table 148 that maps the chunk IDs 325 to a set of information 345, according to an example embodiment of the present application. As shown in the figure, table 148 may include key-value mappings between the keys, which are chunk IDs 325 and values, which are sets of information 345 about chunks corresponding to the chunk IDs 325. Set of information 345 may include information about chunks that correspond to chunk IDs 325 mapped to the set of information 345. Set of information 345 may include chunk hash 330, a pointer (e.g., a logical or physical address) 335 that points to the content of a corresponding chunk, and a reference count 340 of the corresponding chunk. Reference count 340 of a chunk may include the number of pointers (e.g., pointers 335) that point to the content of the chunk.

The following paragraphs briefly describe how a deduplication module may use table 148 to perform an improved deduplication process because of having contiguous chunk IDs. Additional detail for such a process may be found in commonly owned U.S. patent application Ser. No. 16/552,998, which is incorporated herein by reference.

In some embodiments, the deduplication module may use a chunk ID 325 to send a request to obtain set of information 345 about a chunk from table 148. Deduplication module may use chunk ID 325 as a key into chunk ID table 148. The value returned is the set of information 345 about the chunk. Deduplication module may first determine whether the set of information 345 is in a cache memory before checking metadata storage 134, which may consist of one or more physical disks. If the set of information 345 is not in the cache memory, the storage block on which the set of information 345 is stored may be copied or fetched from metadata storage 134 into the cache memory. Thereafter, the deduplication module may obtain from the cache memory the set of information 345 associated with the chunk. This copying of the storage block into (cache) memory may be an automatic part of caching and swapping operations performed by hypervisor 116, an operating system of host 105, and/or a guest operating system of VM 120 (with reference to FIG. 1).

Since entries in table 148 are arranged or organized by sequential and contiguous chunk IDs 325, a storage block containing the set of information 345 corresponding to a given chunk ID 325 is likely to also store the sets of information 345 corresponding to a plurality of chunk IDs 325 that are before and/or after the given chunk ID 325. The sets of information 345 within the storage block may be arranged contiguously with one another in an order that matches the order of associated chunk IDs 325. For example, if a storage block stores the set of information corresponding to chunk ID 325 of a particular chunk, then that same storage block is likely to also store the set of information corresponding to the chunk IDs 325 of the chunks after and/or prior to the particular chunk.

Therefore, when a storage block is read into the cache memory, set of information 345 corresponding to the next chunk is likely to already be in the cache memory as well, precluding a need to copy a new storage block into the cache memory as part of an I/O operation. This may speed up processing and deduplication of chunks of objects. Organizing the sets of information, within chunk ID table 148, by sequential and contiguous chunk IDs 325, preserves locality of deduplicated chunks. The preserved locality results in faster read operations of sets of information 345, because the read operations are executed from a cache memory rather than a physical disk.

After determining that a chunk address 335 is pointing to a chunk that is already processed by the deduplication module (e.g., when chunk hash 330 of the same record is found in a hash table that includes the chunk hashes and their corresponding chunk IDs), the deduplication module may perform a write to the storage block copied into cache to increase reference count 340, within the set of information 345 of the same record, by one. Next, the deduplication module (or a garbage collection module) may unreserve the physical block that stores the chunk associated with the processed chunk ID in the object storage. As mentioned above, additional detail about a deduplication process on chunks of data in the object storage based on metadata stored in the metadata storage may be found in commonly owned U.S. patent application Ser. No. 16/552,998.

As described above, in order to have unique and contiguous chunk IDs, some embodiments may provide arbitrarily assigned alphanumeric identifiers as chunk IDs that preserve locality and sequential order of chunks. Each chunk ID may be generated (e.g., by an uploader server) by combining (e.g., concatenating) a unique fixed value (e.g., the global object ID) with a monotonically incremental value (e.g., a local sequential number). In some embodiments, the chunk ID may include 64 bits with the higher (most significant) 20 bits allocated to the unique (global) value and the lower (least significant) 44 bits allocated to the incremental local value. In some other embodiments, the chunk ID may have a different size and the local and global values may be assigned different numbers of bits.

Figure 4B:
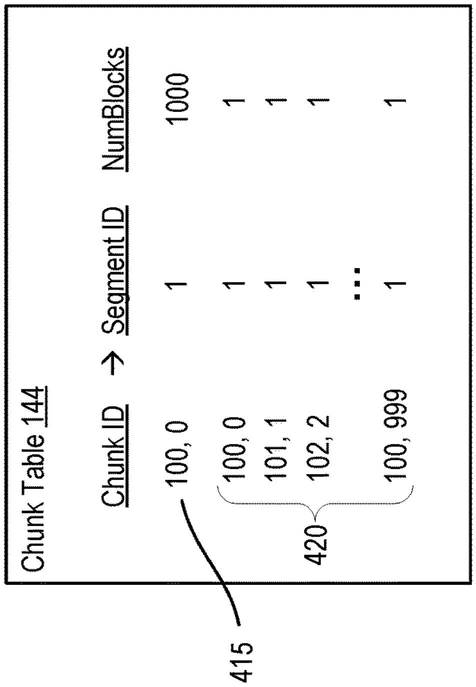
FIGS. 4A-4C illustrate exemplary metadata tables having two-tuple chunk IDs in the metadata storage, according to an example embodiment of the present application.
Figure 4A:
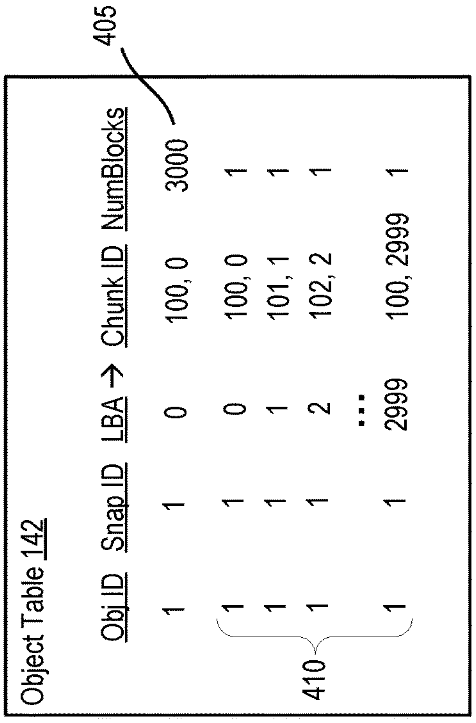
Figure 4C:
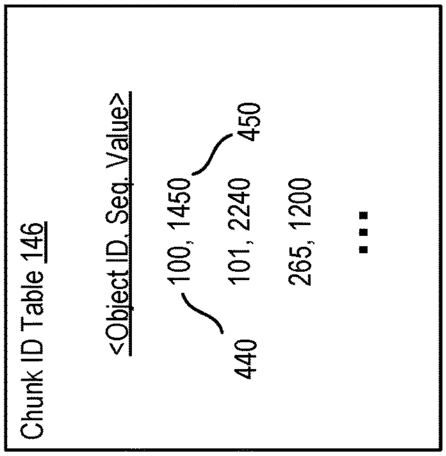

FIGS. 4A-4C illustrate exemplary metadata tables having two-tuple chunk IDs in the metadata storage, according to an example embodiment of the present application. Specifically, FIG. 4A illustrates the same object table 142 that maps some of the received information associated with an object to chunk IDs and number of logical blocks, as was shown in FIG. 3A, with the exception that the one-tuple chunk IDs in FIG. 3A are replaced with two-tuple chunk IDs in FIG. 4A. As shown, when a selected uploader server receives an object ID of 1, a snapshot ID of 1, and a number of blocks of 3000, the uploader server may add a new record 405 to table 142 that maps a three-tuple key <object ID, snap ID, LBA> to a two-tuple value <chunk ID, number of blocks>. The chunk ID in the two-tuple value includes a chunk ID of "100, 0" and the number of blocks is 3000, which is the equivalent (or a compressed form) of all of the records 410, which include contiguous chunk IDs assigned to contiguous LBAs.

Similarly, FIG. 4B illustrates the same Chunk table 144 that maps the chunk IDs to segment IDs and number of physical blocks in the segment, as was shown in FIG. 3B, with the exception that the one-tuple chunk IDs in FIG. 3B are replaced with two-tuple chunk IDs in FIG. 4B. As shown, the chunk ID of "100, 0" is mapped to the segment ID of 1 and the number of blocks is 1000 in record 415, which is the equivalent (or a compressed form) of all of the records 420, which include contiguous chunk IDs for each physical block.

FIG. 4C illustrates an exemplary chunk ID table 146 having two-tuple chunk IDs associated with different objects, according to an example embodiment of the present application. Table 146 may be an ordered KV table (e.g., in the metadata storage) in some embodiments. As shown in the figure, each chunk ID in the table is a combination of a global unique value 440 (e.g., the object ID of "100") and a local monotonically incrementing value 450 (e.g., the local value "1450"). Table 146 may be used by the uploader servers to generate new chunk IDs and to update the table with the newly generated chunk IDs in some embodiments.

As described above, however, in order to allocate (e.g., generating and assigning) a new chunk ID to a chunk of data of a current, or new, object, only one of the uploader servers may be selected (e.g., by the uploader manager) to operate on the KV table 146 for that object. As such, when an uploader server receives an object for which a new chunk ID should be allocated, the uploader server may first make sure that it is the only server that is updating table 146 to allocate the new chunk ID for the object in some embodiments. This is because at any point of time, two or more uploader servers may try to assign new chunk IDs for the same object. For example, a first server that is working on a particular object may fail and, as a result, a second server may take over the job and starts allocating the chunk IDs. While the second server is allocating the chunk IDs, the first server may resolve the failure issue and restart working on allocating chunk IDs for the object. In such a situation, two servers may concurrently work on allocating new chunk IDs to the same object. To avoid having racing uploader servers (e.g., two or more servers working on the same object at the same time), the first uploader server may, in some embodiments, leverage a distributed consensus system (e.g., ETCD, ZOOKEEPER, etc.) along with lease and callback functions to ensure that the second server (or any other uploader server) is not updating the table for the same object (e.g., no other server is allocating new chunk IDs for the same object).

The distributed consensus system, in some embodiments, may include a distributed KV data structure and may support features (or functions) such as insertion (e.g., for inserting values with a lease request to the data structure) and callback (e.g., for being invoked in another function to return to the same instruction) functions. As such, the uploader server may insert the object ID as the key and the uploader server index as the value to the distributed KV data structure (e.g., a distributed table) of the distributed consensus system (e.g., ETCD) requesting a lease of a certain amount of time (e.g., 3 seconds, 5 seconds, etc.) of the object ID with exclusive requirement. The exclusive requirements enables the insert function to return failure if any other server has the lease on the same object. This way, the uploader server makes sure that it is the only server that is working on the object to allocate new chunk IDs to the object. In some embodiments, the uploader server may perform other operations, and not just the insertion of the object ID to the distributed data structure, to make such a determination.

For example, in some embodiments, the uploader server that receives an object ID, to which a new chunk ID should be allocated, may first check to see if the server is the real owner of the object before starting the chunk ID allocation task. For example, the server may run the same consistent hashing algorithm that the uploader manager has run before sending the object ID to the server to ensure that the server is the real owner. If the server receives a different result, the server may stop allocating new chunk IDs to the object in some embodiments.

After the server determines that it is the true owner of the object, the server may determine whether the server has the lease for the object and the lease will not expire in a threshold amount of time (e.g., within 5 seconds). If the answer to both questions are positive the server may start allocating new chunk IDs to the object, as further described below with reference to FIG. 5. However, if the server determines that either the server is not the lease holder for the object or there is not enough time for the allocation task (e.g., the lease will time out within a threshold time period), the server may perform the following operations in some embodiments.

When the server determines that it is not a leaseholder of the object (or the lease is going to expire soon), the server may search the distributed data structure (e.g., a distributed table) for the object ID. If the object ID is found in the distributed table, the server may renew the lease on the object for some additional time (e.g., another 5 seconds). However, if the object ID is not found in the distributed table, the server may insert the object ID with the server number (or index) to the distributed table and request a threshold lease time for working on the object.

In some embodiments, if the insertion fails, the server may check to see if any other server has taken the ownership of the object (e.g., using the consistent hashing algorithm). The server may stop working on allocating chunk IDs for the object if the server determines that another uploader server has taken ownership of the object. Otherwise, when the server itself is still the owner of the object, the server may subscribe to the callback function of the consensus system and exit. This way, whenever another server releases the object, the server (which is the real owner) will insert the object ID with a new lease to the distributed table. By performing all of the above-described operations, an uploader server may be able to be certain that it is the only server that is working on the object in the chunk ID table 146 (in FIG. 4C) in some embodiments.

Figure 5:
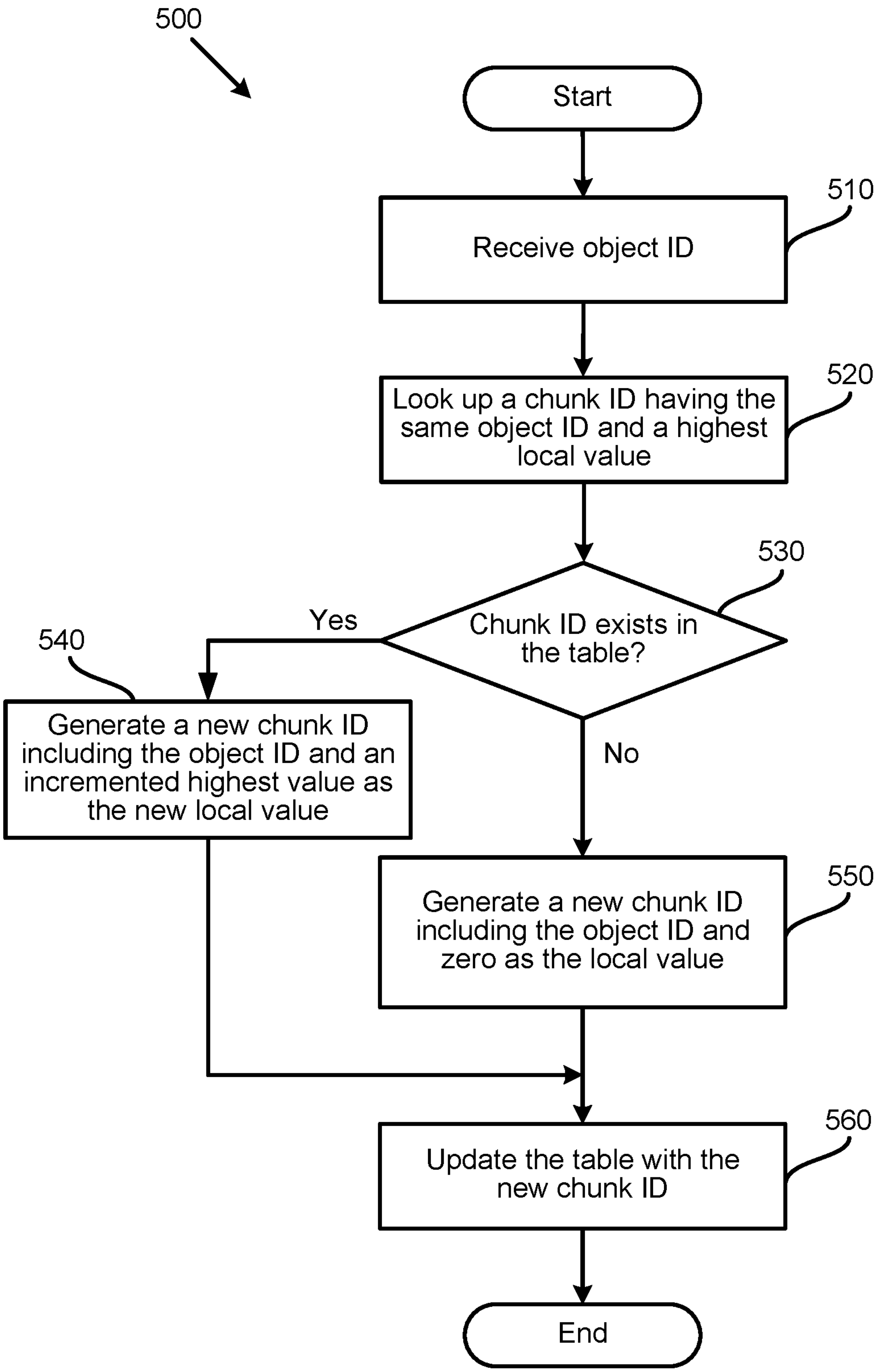
FIG. 5 is a flowchart illustrating a method (or process) for generating new chunk IDs for objects stored in the object storage, according to an example embodiment of the present application.

FIG. 5 is a flowchart illustrating a method (or process) 500 for generating new chunk IDs for objects stored in the object storage, according to an example embodiment of the present application. Process 500 may be performed by one of the plurality of uploader servers 155, with reference to FIG. 1. Process 500 may receive, at 510, an object ID for which a new chunk ID(s) has to be allocated. As described above, the process may receive the object ID from an uploader manager, such as uploader manager 135 (with reference to FIG. 1).

After receiving the object ID (e.g., and after determining that there is no other uploader server concurrently working on the same object), process 500 may look up, at 520, a chunk ID that has a uniqueID corresponding to the object ID (e.g., the same object ID as the received object ID) and highest sequential value in an ordered KV table, such as chunk ID table 146 of the metadata storage, as described above with reference to FIG. 4C. To look up the table, process 500 of some embodiments may create a two-tuple chunk ID (e.g., a lookup chunk ID) that is a combination of the object ID (though as discussed a different uniqueID may be used) as the first tuple, and a highest possible value as the local value (e.g., 0xFFFFFFFFFFFF when 44 bits is allocated to the incremental value) as the second tuple of the lookup chunk ID. The process may then perform a reverse scan of the chunk ID table to identify the last used largest chunk ID in the table. For example, the uploader server may generate a lookup chunk ID that is a concatenation of the object ID "100" and "0xFFFFFFFFFFFF". The uploader server may then look up the chunk ID table 146 for a chunk ID that has the highest value before the generated lookup chunk ID<100, 0xFFFFFFFFFFFF>. Table 146, in response to this look up, as shown in FIG. 4C, may return <100, 1450> as the highest value that is smaller than <100, 0xFFFFFFFFFFFF>.

At 530, process 500 may determine whether the looked up chunk ID (e.g., chunk ID<100, 1450>) is found in the table. In some embodiments, if the process finds a chunk ID that has a highest value before the lookup chunk ID, the process may generate, at 540, a new chunk ID that includes the same object ID as the unique global value in the first tuple of the chunk ID and an incremented highest local value as the new local value (e.g., that is equal to the number in the second tuple of the found chunk ID (1450)+1, in the above example) as the second tuple of the chunk ID. As a result, for the above example, process 500 may generate a new chunk ID<100, 1451> to allocate to the first chunk of the object associated with the object ID 100.

On the other hand, if the uploader server does not find a chunk ID that has the highest value before the lookup chunk ID in the chunk ID table, process 500 may generate, at 550, a new chunk ID (e.g., to be assigned to the first chunk of the newly stored object) that has the same first tuple (e.g., the object ID) as the lookup chunk ID and an initial value (e.g., zero) as the second tuple. Process 500 may then update, at 560, the chunk ID table with the generated chunk ID(s). For example, if the generated chunk ID is the first chunk ID for the object, the process may add the generated chunk ID to the chunk ID table (e.g., create a new record for the new chunk ID in the table). Otherwise, the process may replace the previously stored chunk ID with the newly generated chunk ID in the chunk ID table. The process may then end.

The specific operations of process 500 may not be performed in the exact order shown and described. Additionally, the specific operations may not be performed in one continuous series of operations, and different specific operations may be performed in different embodiments. For example, in some embodiments, process 500 may perform a set of operations, as described above, for determining that the uploader server is the only uploader server that is working on the object after the process receives (at 510) the object ID and before the process looks up (at 520) the chunk ID table for a chunk ID that has the same object ID and the highest local value.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer system, comprising:

a memory; and at least one processor coupled to the memory, the processor being configured to:

receive, at a first metadata server in a plurality of metadata servers, information associated with an object stored in the cloud storage, the information comprising at least an object identification (ID) for the object and a plurality of logical block addresses (LBAs) for where the object is stored, wherein each of the plurality of metadata servers allocates unique and contiguous chunk IDs that point to a group of objects in the cloud storage;

generate, by the first metadata server, at least one new chunk ID for the object, the at least one new chunk ID being a combination of a unique fixed value associated with the object and a monotonically incrementing local value associated with each LBA, such that a first LBA is mapped to a first chunk ID having a first local value and a next LBA is mapped to a second chunk ID having the first local value incremented as a second local value; and store the at least one new chunk ID and other metadata associated with the object in a set of one or more tables stored in a metadata storage, wherein the first metadata server generates the new chunk ID by:

determining whether a chunk ID that includes the object ID and a highest local value is stored in a table storing chunk IDs;

when the chunk ID that includes the object ID and the highest local value is found in the table, generating the new chunk ID by combining the object ID with the highest local value incremented as a new local value for the new chunk ID;

when no chunk ID that includes the object ID is found in the table, generating the new chunk ID by combining the object ID with an initial value as the new local value for the new chunk ID; and updating the table with the new chunk ID.

2. The computer system of claim 1, wherein receiving the information associated with the object comprises receiving the information from an uploader agent residing in a host machine of a datacenter, wherein the uploader agent stores the object in the cloud storage and performs a consistent hashing algorithm to identify the first metadata server in the plurality of metadata servers to send the information associated with the object.

3. The computer system of claim 2, wherein the object comprises a virtual disk of a virtual machine executing on the host machine of the datacenter, wherein a second datacenter uses the cloud storage and the metadata storage to recover the virtual disk and run the virtual machine in case of a failure in the datacenter.

4. The computer system of claim 1, wherein the first metadata server uses a distributed consensus system along with lease and callback functions when generating the at least one new chunk ID and updating the table to prevent other metadata servers in the plurality of metadata servers from concurrently generating another chunk ID for the object.

5. The computer system of claim 1, wherein the object ID and the plurality of LBAs are mapped to the new chunk ID and a number of logical blocks in a first table of the set of tables in the metadata storage, wherein the new chunk ID is mapped to a segment in the cloud storage and a number of physical blocks in the segment in a second table of the set of tables in the metadata storage.

6. A method for managing metadata associated with data stored in a cloud storage, comprising:

receiving, at a first metadata server in a plurality of metadata servers, information associated with an object stored in the cloud storage, the information comprising at least an object identification (ID) for the object and a plurality of logical block addresses (LBAs) that indicate where the object is stored, wherein each of the plurality of metadata servers allocates unique and contiguous chunk IDs that point to a group of objects in the cloud storage;

generating, by the first metadata server, at least one new chunk ID for the object, the at least one new chunk ID being a combination of a unique fixed value associated with the object and a monotonically incrementing local value associated with each LBA, such that a first LBA is mapped to a first chunk ID having a first local value and a next LBA is mapped to a second chunk ID having the first local value incremented as a second local value; and storing the at least one new chunk ID and other metadata associated with the object in a set of one or more tables stored in a metadata storage, wherein the first metadata server generates the new chunk ID by:

determining whether a chunk ID that includes the object ID and a highest local value is stored in a table storing chunk IDs;

when the chunk ID that includes the object ID and the highest local value is found in the table, generating the new chunk ID by combining the object ID with the highest local value incremented as a new local value for the new chunk ID;

when no chunk ID that includes the object ID is found in the table, generating the new chunk ID by combining the object ID with an initial value as the new local value for the new chunk ID; and updating the table with the new chunk ID.

7. The method of claim 6, wherein receiving the information associated with the object comprises receiving the information from an uploader agent residing in a host machine of a datacenter, wherein the uploader agent stores the object in the cloud storage and performs a consistent hashing algorithm to identify the first metadata server in the plurality of metadata servers to send the information associated with the object.

8. The method of claim 7, wherein the object comprises a virtual disk of a virtual machine executing on the host machine of the datacenter.

9. The method of claim 8, wherein a second datacenter uses the cloud storage and the metadata storage to recover the virtual disk and run the virtual machine in case of a failure in the datacenter.

10. The method of claim 6, wherein the first metadata server uses a distributed consensus system along with lease and callback functions when generating the at least one new chunk ID and updating the table to prevent other metadata servers in the plurality of metadata servers from concurrently generating another chunk ID for the object.

11. The method of claim 6, wherein the object ID and the plurality of LBAs are mapped to the new chunk ID and a number of logical blocks in a first table of the set of tables in the metadata storage.

12. The method of claim 11, wherein the new chunk ID is mapped to a segment in the cloud storage and a number of physical blocks in the segment in a second table of the set of tables in the metadata storage.

13. The method of claim 6, wherein the cloud storage and the metadata storage are two different data storages that are remotely separated.

14. The method of claim 6, wherein a deduplication module deduplicates a plurality of objects including the object stored in the cloud storage using a plurality of chunk IDs including the new chunk ID.

15. A non-transitory computer readable medium comprising instructions that, when executed by one or more processors of a computing system, cause the computing system to perform a method for managing metadata associated with data stored in a cloud storage, the method comprising:

receiving, at a first metadata server in a plurality of metadata servers, information associated with an object stored in the cloud storage, the information comprising at least an object identification (ID) for the object and a plurality of logical block addresses (LBAs) for where the object is stored, wherein each of the plurality of metadata servers allocates unique and contiguous chunk IDs that point to a group of objects in the cloud storage;

generating, by the first metadata server, at least one new chunk ID for the object, the at least one new chunk ID being a combination of a unique fixed value associated with the object and a monotonically incrementing local value associated with each LBA, such that a first LBA is mapped to a first chunk ID having a first local value and a next LBA is mapped to a second chunk ID having the first local value incremented as a second local value; and storing the at least one new chunk ID and other metadata associated with the object in a set of one or more tables stored in a metadata storage, wherein the first metadata server generates the new chunk ID by:

determining whether a chunk ID that includes the object ID and a highest local value is stored in a table storing chunk IDs;

when the chunk ID that includes the object ID and the highest local value is found in the table, generating the new chunk ID by combining the object ID with the highest local value incremented as a new local value for the new chunk ID;

when no chunk ID that includes the object ID is found in the table, generating the new chunk ID by combining the object ID with an initial value as the new local value for the new chunk ID; and updating the table with the new chunk ID.

16. The non-transitory computer readable medium of claim 15, wherein receiving the information associated with the object comprises receiving the information from an uploader agent residing in a host machine of a datacenter, wherein the uploader agent stores the object in the cloud storage and performs a consistent hashing algorithm to identify the first metadata server in the plurality of metadata servers to send the information associated with the object.

17. The non-transitory computer readable medium of claim 16, wherein the object comprises a virtual disk of a virtual machine executing on the host machine of the datacenter, wherein a second datacenter uses the cloud storage and the metadata storage to recover the virtual disk and run the virtual machine in case of a failure in the datacenter.

18. The non-transitory computer readable medium of claim 15, wherein the first metadata server uses a distributed consensus system along with lease and callback functions when generating the at least one new chunk ID and updating the table to prevent other metadata servers in the plurality of metadata servers from concurrently generating another chunk ID for the object.

19. The non-transitory computer readable medium of claim 15, wherein the cloud storage and the metadata storage are two different data storages that are remotely separated.

20. The non-transitory computer readable medium of claim 15, wherein a deduplication module deduplicates a plurality of objects including the object stored in the cloud storage using a plurality of chunk IDs including the new chunk ID.

* * * * *